Patented Jan. 7, 1941

2,228,106

UNITED STATES PATENT OFFICE 2,228,106

ROLLING BEARING

Biagio Beria, Turin, Italy, assignor to Societa Anonima Officine di Villar Perosa, Turin, Italy No Drawing. Application September 28, 1938, Serial No. 232,055. In Italy November 3, 1937

3 Claims. (Cl. 308—216)

In the manufacture of roller bearings, steels are employed for making the members provided with the rolling tracks for the rollers, balls or needles, containing a high carbon percentage and various other additional elements, which have been subjected to a thorough hardening, the so-called "heart" hardening.

When, owing to room or operating conditions, the working temperature of the bearings exceeds 120–150° or more, the steel loses the properties acquired on hardening, this loss occurring all the more rapidly as the working temperature increases.

Ordinary bearing steels are also seriously damaged inconsistently with high accuracy requirements, by the chemical action exerted by atmospherical, corrosive or other agents, as well as by sliding friction occurring during operation by reason of the elastic deformations taking place between the rolling members and tracks.

This invention relates to improvements in rolling bearings which eliminate the above mentioned drawbacks.

According to this invention the members on which the tracks for the rolling members, that may be either balls, rollers, needles or the like, are provided and/or the rolling bodies are made of stainless martensitic steel comprising up to 1.5% C and about 18% Cr, which has been submitted to a nitriding process.

It has already been proposed to employ for the manufacture of rolling bearings special steels of which the rolling surfaces are hardened by a nitriding treatment. However, with the structure and composition of these steels, nitriding forms a very brittle superficial layer, in which superficial cracks occur during operation, seriously endangering the life of the bearing. Moreover, the superficial hardness obtainable does not meet the requirements of high-load bearings.

By using the steel according to this invention a very hard and tough superficial layer is obtained, which is unaffected by atmospheric and chemical agents as well as by increases in temperature, as will be explained more specifically hereinafter.

When a considerable hardness of the core is desired, it is advisable to add to the above steel about 1% V and about 1% Mo. A steel of this composition will attain during a prolonged nitriding heat a core hardness of about 550 to 600 Brinell, a value never reached heretofore with nitrided steels and a very important factor in the use of steel for rolling bearings, as it avoids breakdown of the superficial layer under the action of the pressures concentrated on a rather limited surface.

It has further been ascertained that an increase in the superficial layer up to about 1500 Brinell may be obtained by subjecting steels nitrided according to this invention, after actual nitriding, to a hardening, which does not produce any deformation of the article contrarily to hardening of ordinary steels. The invention therefore consists also in using for rolling bearings nitrided steels with a high chromium content that have been subjected after a nitriding to a hardening treatment at temperatures of about 500° C. and more, according to the desirable limits of superficial hardness.

Without incurring any other possible drawbacks, such as increased brittleness etc., this invention does away practically in all cases with the damages occurring in known bearings during operation when the temperature exceeds 150° C., as the working or room temperatures do not affect the mechanical structural characteristics of the present steel, except at temperatures exceeding 550° C., so that it becomes possible to reach, even in bearings subjected to very high loads, a considerably increased life and operating range as compared with previous achievements.

This invention further eliminates the danger of breakdown of the superficial layer, without affecting the possibility of operation at high temperatures and under high loads.

Without impairing the other advantages of the bearing, the rolling surfaces acquire a high degree of chemical passivity, as the nitrided layer of stainless martensitic steels is not as a rule attacked by the agents which objectionably affect other steels.

Finally, the sliding friction generated between the surfaces of the tracks and rolling members does not result in the damages ascertained on steels employed heretofore, as the resistance to wear of the superficial layers of the steel according to this invention is a multiple of that of steels employed or proposed heretofore for rolling bearings.

According to this invention it is therefore possible to increase the ratio between the radii of the balls and tracks, that is the so-called "contact coefficient," so that it is possible to increase the load on the bearing without departing from the admissible limits for specific pressures.

It will be obvious that the steels according to this invention may include besides the above mentioned elements, the elements ordinarily contained in steels, namely silicium, manganese, etc., in the ordinary percentages, while they are practically free from wolfram and aluminium, which were found to be deleterious to the superficial strength.

What I claim is:

1. Articles for the support of rotating members and more particularly rolling members for antifrictional bearings, said articles consisting of stainless martensitic steel containing up to 1.5% C, approximately 18% Cr, remainder iron and being hardened on their working faces by nitriding in order to effect a complete conversion of the complex chromium iron carbides into nitrocarbides, said working faces being resistant to cracking and their hardness remaining unchanged even at temperatures above 150° C. and up to 580° C.

2. Articles for the support of rotating members and more particularly rolling members for antifrictional bearings, said articles consisting of stainless martensitic steel containing up to 1.5% C, approximately 18% Cr, approximately .5 to 1% Mo, remainder iron and being hardened on their working faces by nitriding in order to effect a complete conversion of the complex chromium iron carbides into nitrocarbides, said working faces being resistant to cracking and their hardness remaining unchanged even at temperatures above 150° C. and up to 580° C.

3. Articles for the support of rotating members and more particularly rolling members for antifrictional bearings, said articles consisting of stainless martensitic steel containing up to 1.5% C, approximately 18 Cr, remainder iron, and being hardened on their working faces by nitriding and subsequent annealing at about 500° C. in order to reach a hardness of about 1500 Brinell in the working faces, said working faces being resistant to cracking and their hardness remaining unchanged even at temperatures above 150° C. to 580° C.

BIAGIO BERIA.